May 24, 1966  J. S. PAGE, JR  3,252,476
FLUID PRESSURE RESPONSIVE VALVE AND CONTROL MEANS THEREFOR
Filed April 12, 1963  3 Sheets-Sheet 1

INVENTOR.
JOHN S. PAGE, JR.
BY Paul A. Weilein
ATTORNEY.

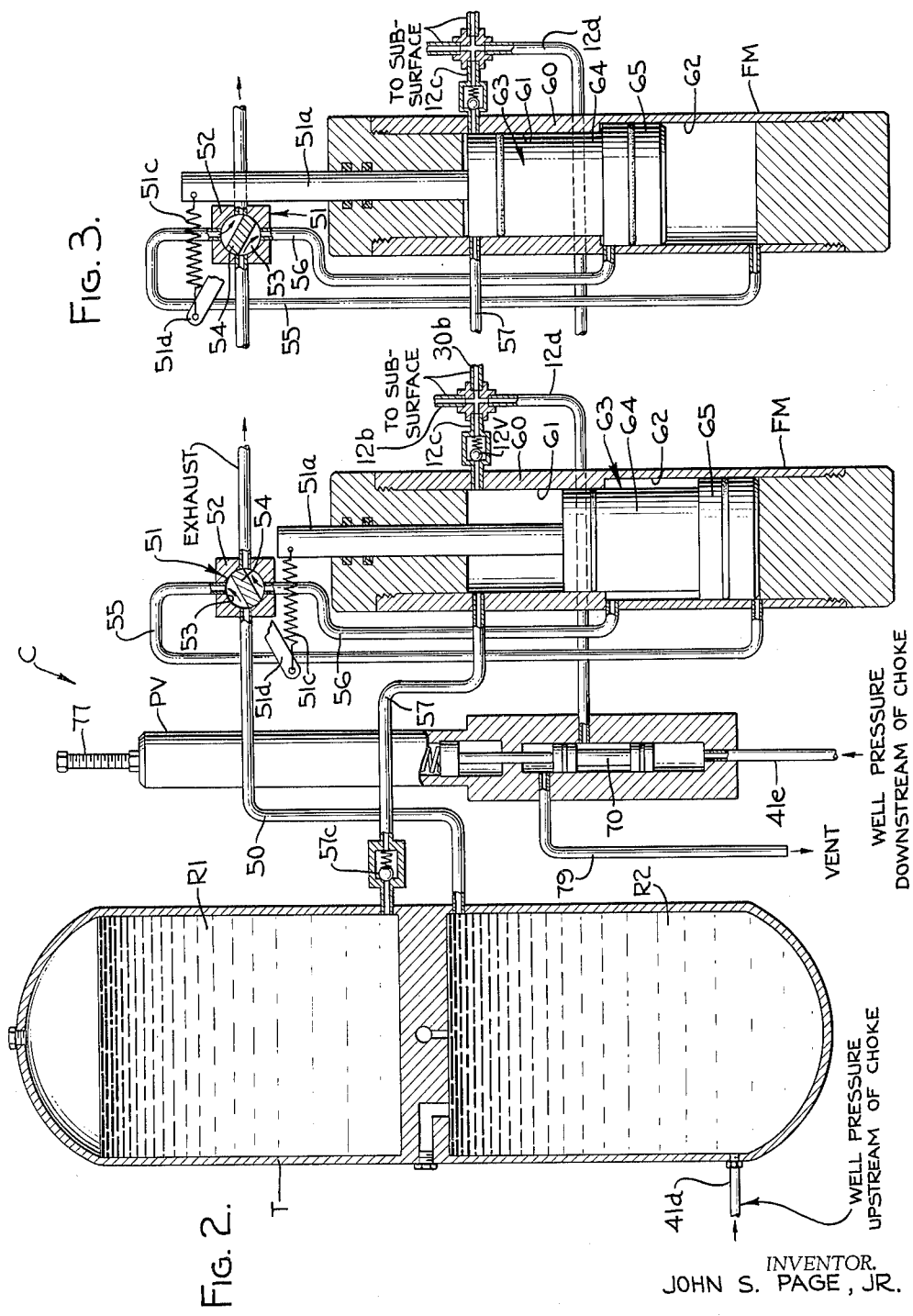

May 24, 1966     J. S. PAGE, JR     3,252,476
FLUID PRESSURE RESPONSIVE VALVE AND CONTROL MEANS THEREFOR
Filed April 12, 1963     3 Sheets-Sheet 3
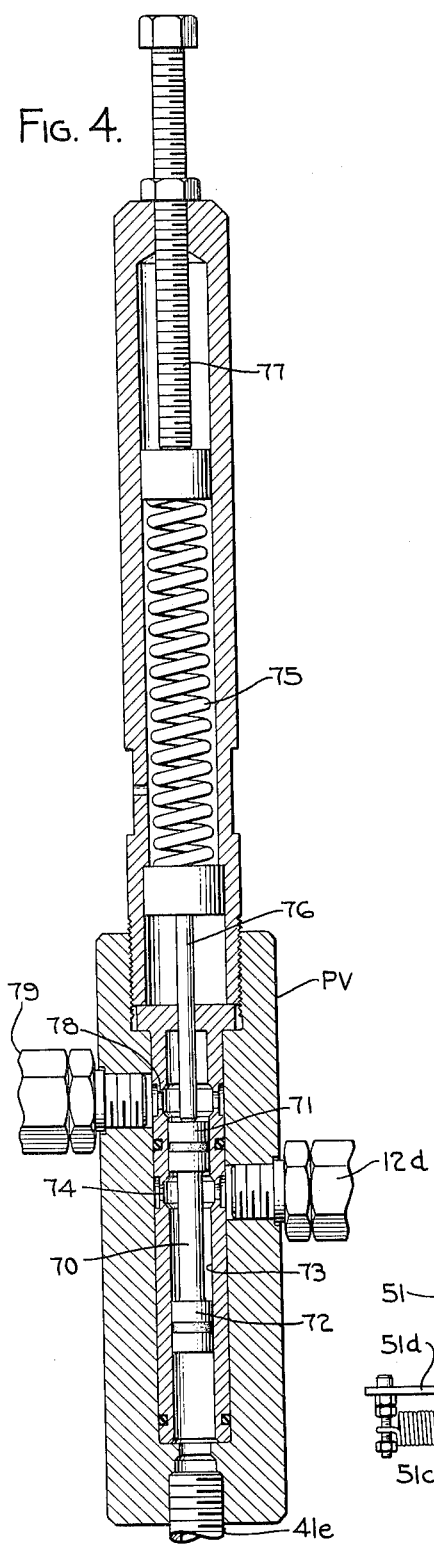
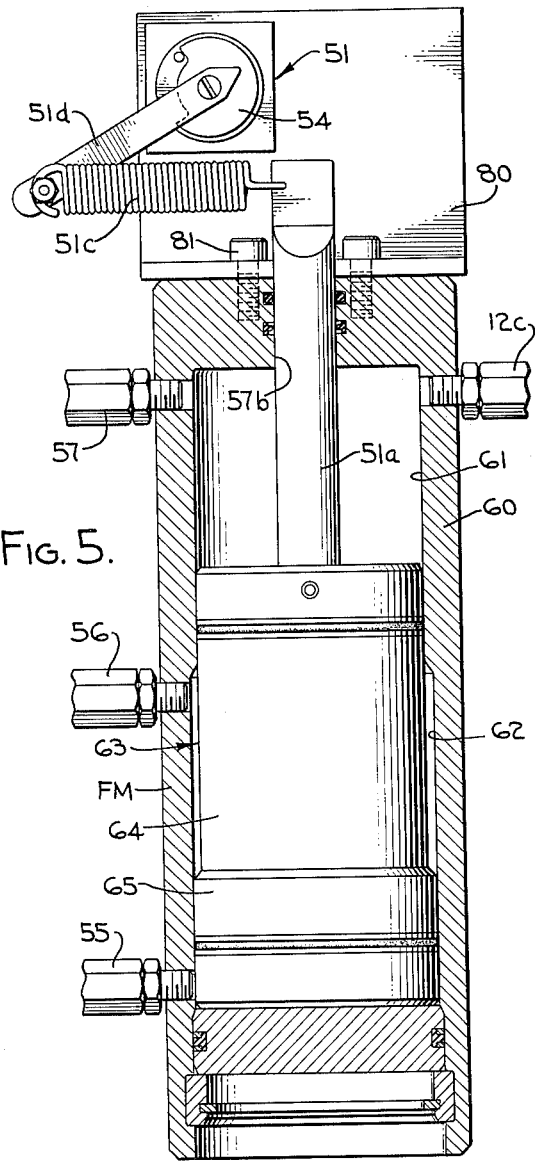
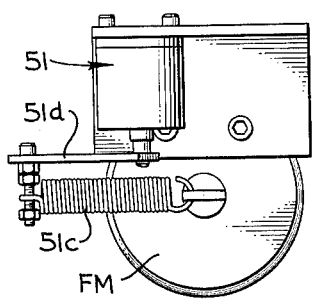
INVENTOR.
JOHN S. PAGE, JR.
BY
Paul A. Weilein
ATTORNEY.

United States Patent Office 3,252,476
Patented May 24, 1966

3,252,476
FLUID PRESSURE RESPONSIVE VALVE AND
CONTROL MEANS THEREFOR
John S. Page, Jr., 1450 El Mirador Ave.,
Long Beach, Calif.
Filed Apr. 12, 1963, Ser. No. 272,737
7 Claims. (Cl. 137—458)

The present invention relates to valve means for controlling the production of fluid from wells such as oil and gas wells. The present invention is an improvement in apparatus of the type disclosed and claimed in the application of John S. Page and John S. Page, Jr., Serial No. 450,884, filed August 19, 1954, in the sense that while the apparatus of that pending application may employ the pressure of production fluid at the well head to hold a subsurface control valve in an open position so that the flow of production fluids may continue, the present invention provides in combination with such a system, means for obtaining a hydraulic force advantage so that the pressure applied to hold the subsurface valve open is at a value greater than production fluid pressure at the surface.

An object of the present invention is to provide apparatus as generally characterized above, in which force multiplier means are interposed between the flow line leading from the well head and a subsurface valve control line which conducts fluid under pressure to the subsurface valve, whereby the effective pressure acting on the subsurface valve to hold the same open may be, for example, on the order of from 1.25 to 1.50 times the actual pressure of production fluid in the flow line.

Another object of the invention is to provide a hydraulic force multiplier system for controlling subsurface valves.

Another object of the invention is to provide a hydraulic force multiplier system and subsurface well valve assembly, providing a hydraulic valve actuator having means for compensating for loss of fluid in the system.

In accomplishing the foregoing objectives, as well as other objects and advantages which will be apparent to those skilled in the art, the present invention provides surface control means including a force multiplier or differential hydraulic piston device, whereby the pressure of fluid produced at the well surface is imposed on the larger end of the differential piston and a hydraulic pressure of higher value is transmitted to the subsurface valve, the force multiplier being controlled by fluid pressure responsive pilot valve means which will respond to variations in the pressure of production fluid, whereby the control fluid pressure applied to the subsurface valve to hold the same open will be vented, allowing closure of the subsurface valve.

In addition, in accomplishing the foregoing objects, an automatic surface control valve responsive to the position of the differential piston is employed to cause cycling of the force multiplier to enable refilling of the system comprising the force multiplier and the subsurface valve from a source of supplemental fluid, without causing closure of the subsurface valve.

Other objects and advantages of the invention will be hereinafter described or will be apparent to those skilled in the art and the novel features will be defined in the appended claims.

Referring to the drawings:

FIG. 2 is a view schematically illustrating the surface control means of the invention with the hydraulic force multiplier shown in one position;

FIG. 3 is a fragmentary schematic view illustrating the hydraulic force multiplier in another position;

FIG. 4 is a vertical sectional view through the pilot valve means;

FIG. 5 is a vertical sectional view through the hydraulic force multiplier; and

FIG. 6 is a top plan view of the structure of FIG. 5.

Like reference characters in the several views of the drawing and in the following description designate corresponding parts.

Figure 1:
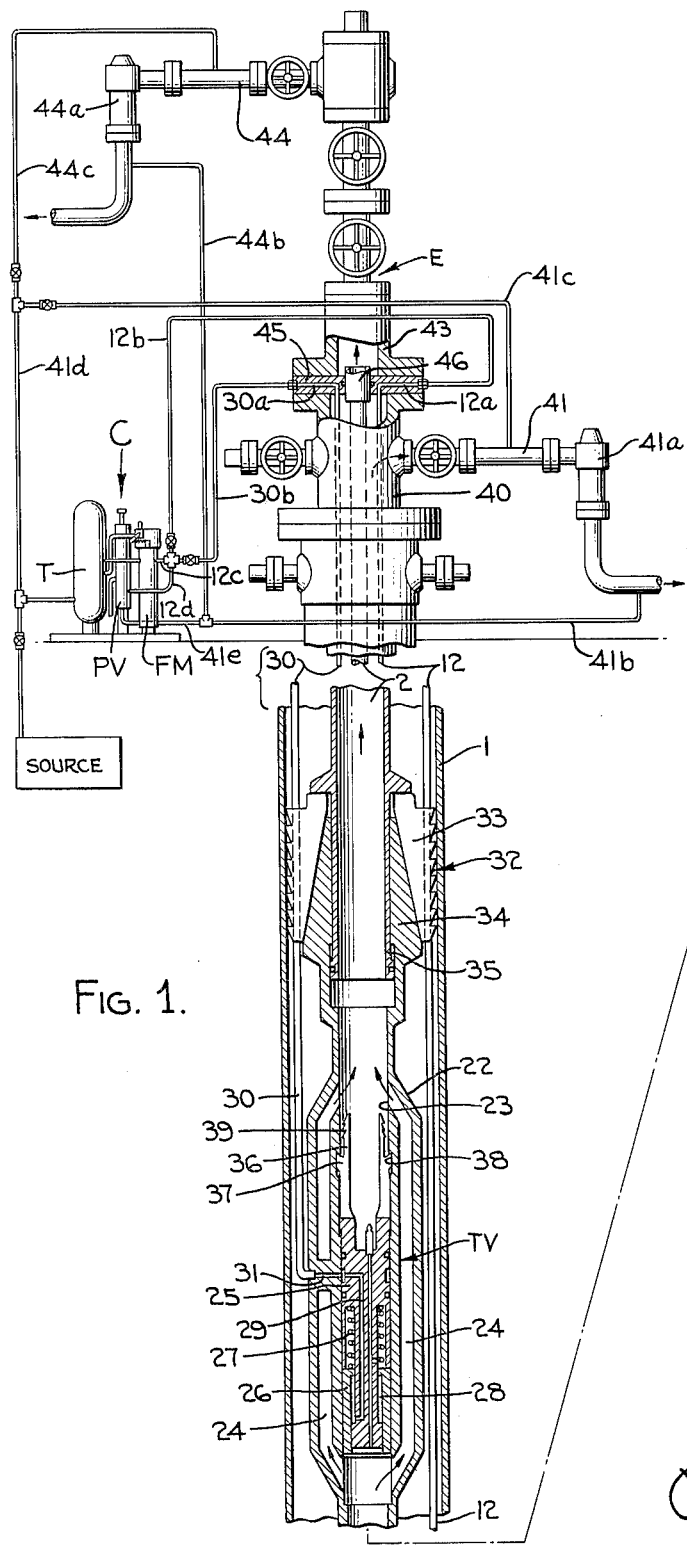
FIG. 1 is a view schematically illustrating the installation of a dual zone control valve system in accordance with the invention.

Referring to FIG. 1, the surface control means of the invention is schematically illustrated at C as applied to typical well-head equipment, generally denoted at E and traditionally characterized as a Christmas tree.

The well head equipment is disposed at or adjacent the earth's surface at the top of a well extending into the earth and having therein well casing 1. Concentrically disposed within the well casing 1 is a string of production tubing 2, adjacent the lower end of which is a packer P forming a seal between two vertically spaced perforated casing zones generally denoted at 1Z and 2Z.

Well production fluids will pass into the casing 1 through the perforated zone 1Z, and such fluids are isolated from fluids passing into the casing zone 2Z by the packer P so that the latter fluid will find access to the lower end of the production tubing 2, as indicated by the arrows, and hence may be produced to the surface of the earth, while fluids passing into the casing through zone 1Z will be conducted to the surface through the annulus formed between the tubing and the casing.

In accordance with the present invention it is desired that the flow of production fluids from either zone be under the control of a subsurface valve. Therefore, carried by the tubing is what may be characterized as an annulus valve AV for controlling the flow of well fluids upwardly through the tubing casing annulus. Installed within the tubing 2 is a retrievable tubing valve TV.

The annulus valve AV may be of any desired type, such as that shown in the patent issued to John S. Page on May 22, 1962, Patent No. 3,035,642.

The valve AV as herein shown generally comprises a body 3 through which extends a flow passage 4 there being upper ports 5 and lower ports 6 communicating with the passage 4 at opposite sides of a packer 7 or other sealing means for effecting a seal between the valve body 3 and the casing 1. Means are provided for closing the upper passageway 5 and such means may comprise a valve sleeve 8 slidably and sealingly engaged within the body 3 and defining with a central hollow mandrel 9 of the body a portion of the aforementioned flow passage 4. The valve sleeve 8 has an actuator piston 10 thereon subjected to the pressure of fluid passing through the flow passage and to the pressure of fluid within an annular chamber 11 defined between the body 3 and the valve sleeve. Control fluid pressure is supplied to the chamber 11 through a control line or tubing 12, as will be hereinafter described. If desired, a coiled compression spring 13 may be employed to augment the hydraulic forces acting on the valve piston 10 to cause movement of the latter to a position closing the upper port 5.

In the illustative annulus valve assembly AV the sealing means or packer is set in sealing engagement with the casing 1, and the assembly is held against downward movement in the casing 1 by means of a plurality of laterally movable slip elements 14 adapted to bite into the casing upon expansion of the slips by a downwardly tapered cone surface 15. The slips 14 may by hydraulically set by the action of fluid pressure in a chamber 17 defined between the hollow mandrel 9 and a slip actuator sleeve 18 which is axially movably supported upon the mandrel 9. A spring 19 may be employed to normally maintain the actuator sleeve 18 in a downward position, but fluid under pressure entering the chamber 17 through mandrel ports 20 will act upon an inner annular piston 21 of the actuator sleeve 18, so as to force the sleeve upwardly, thus causing the aforementioned lateral movement of the slips 14 by the cone 15.

Referring to the control valve means TV in the tubing 2, it comprises a valve body 22 adapted to be made up in the string of tubing 2 and having a central bore 23 therethrough, preferably of a diameter at least equal to the inside diameter of the tubing 2. Bypass ports 24 are provided through the body 22 whereby fluid passing upwardly through the tubing is conducted around a wire line retrievable valve insert assembly which is seated and removably located in the central bore of the body 22. This valve assembly TV may be of the type more specifically shown and described in my pending application, Serial No. 112,886, filed May 26, 1961.

The wire line retrievable insert of the valve assembly TV generally comprises a body 25, at the lower end of which is reciprocably disposed a valve sleeve 26 adapted to move between the illustrated upper position at which the bypass ports 24 are open to a lower position closing off the lower ends of the bypass ports. Movement of the sleeve 26 to said lower position may be accomplished in the illustrative embodiment by a spring 27 acting downwardly on the sleeve 26. This sleeve 26 is adapted to be held in the aforesaid upper position by fluid pressure admitted to an annular chamber 28 defined between the sleeve 26 and the lower portion of the body 25 of the insert. Fluid under pressure is admitted to the chamber 28 through an insert port 29, which communicates with a control fluid line or tubing 30 leading downwardly through the tubing casing annulus, there being ports 31 in the valve body 22 leading from the control line 30 to the insert port 29.

Illustratively, the valve body 22 and hence the lower portion of the tubing 2, including the above described annulus valve assembly AV, is anchored against upward movement in the casing 1 by means of a tubing anchor generally denoted at 32, and including upwardly holding slip elements 33. These slip elements 33 are laterally movable into anchoring engagement with the casing 1 by means of an upwardly tapered cone 34 upon relative longitudinal movement between the tubing 2 and the cone 34, as is provided for by a connection 35 allowing for limited relative longitudinal movement thereof.

The insert body 25 of the valve assembly is releasably latched in the body 22 by means of a plurality of upwardly projecting spring latch fingers 36 having thereon outwardly extended lugs 37 latchingly engageable in an internal undercut groove 38 formed within the valve body 22. At the upper extremities of the fingers 36 are fishing projections 39 having teeth thereon engageable by a conventional wire line recovery tool, as is well known to those skilled in the art, whereby the latching fingers 36 will be deflected inwardly releasing the lugs 37 from the groove 38 so that the insert body 25 and sleeve 26 may be recovered as an assembly by such wire line tool.

From the foregoing, it will now be apparent that fluid produced from a lower productive earth formation and passing through the perforated zone 2Z of the casing 1 will flow upwardly through the mandrel 9 of the annulus valve AV, and thence on upwardly through the tubing 2 and through the tubing valve TV so long as the bypass ports 24 of the latter are open as illustrated in FIG. 1; in addition it will be apparent that well fluids produced from an earth formation adjacent the perforated casing zone 1Z will pass upwardly through the annulus valve assembly AV so long as the valve sleeve 8 is in the position illustrated in FIG. 1, and thence will pass upwardly through the tubing casing annulus around the tubing valve TV.

Well fluids produced upwardly through the tubing casing annulus pass into a well head section 40 and thence away from the well head through a flow line 41 having a typical choke 41a therein, as is apparent. Fluid produced upwardly through the tubing 2 will pass into a well head section 43 and thence through a flow line 44 having a choke 44a therein, as is apparent.

Means are provided for conducting control fluid under pressure to the respective control lines or tubings 12 and 30. Accordingly, there is illustrated a flange 45 which is made up between the well head sections 40 and 43 referred to above, there being a sealing fitting 46 at the upper extremity of the tubing 2 which is sealed within the central opening of flange 45. Passageways respectively designated 12a and 30a in the flange 45 will conduct control fluid pressure to the lines or tubings 12 and 30 from a source of fluid under pressure which forms a part of surface apparatus, as will now be described.

The surface apparatus comprising the control means above referred to includes a tank T, associated pilot valve means PV and associated hydraulic force multiplier means FM.

In the apparatus as generally illustrated in FIG. 1 it will be noted that lines 12b and 30b, respectively, lead from a common line 12c connecting the force multiplier FM to the aforementioned flange 45 for hydraulic connection to the respective control lines or tubings 12 and 30. Leading to the pilot valve means via a common line 41e from the flow lines 41 and 44 respectively, and from the down stream side of the respective chokes 41a and 44a, are pilot valve pressure control lines 41b and 44b. High control fluid pressure is derived from the production fluid in the flow lines at the up-stream side of the chokes 41a and 44a through lines designated 41c and 44c respectively, leading from the flow lines 41 and 44 to the tank T through a common lines 41d.

With particular reference to FIGS. 3, 4 and 5, the relationship between the tank, the pilot valve means, the force multiplier means, just referred to above will be recognized. The tank T is preferably divided into two compartments including an upper reservoir section R1 and a lower section R2, it being noted that the common line 41d which is in communication with production fluid pressure from the respective flow lines 41 and 44, leads into the tank section R2, contained within which is a body of fluid at a pressure related to the high fluid pressure of the well fluids at the well head.

This production fluid pressure passes from the tank section R2 through a line 50 to a control valve 51 which constitutes means for admitting well fluid pressure to the force multiplier FM or exhausting the same to atmosphere, depending upon the condition of the valve 51. This valve 51 includes a body 52 having a valve chamber 53 therein. A valve rotor 54 within the chamber 53 controls the flow of well fluid pressure from the tank R2 so that such fluid under pressure either passes, as shown in FIG. 2, through a line 55 to the lower section of the force multiplier FM or through a line 56 to a higher intermediate section of the force multiplier FM when the valve rotor 54 is in the position shown in FIG. 3. A third line leads into a yet higher portion of the force multiplier FM, this line being designated 57 and leading from the upper reservoir section R1 of the tank T, there being in this line a check valve 57c to prevent back flow into the tank.

Referring now to the force multiplier FM, it will be noted that it comprises a body or cylinder 60, bored at 61 to provide a piston chamber, and counterbore at 62 to provide a slightly larger piston chamber. Reciprocably disposed in the bores 61 and 62 is a stepped piston 63 having a reduced diameter portion 64 reciprocable in the bore 61, and a slightly larger diameter portion 65 reciprocable in the counterbore 62. The aforementioned line 55 leads into the bore 62 below the enlarged piston portion 65; the aforementioned line 56 leads into the bore 62 above the enlarged piston portion 65; the aforementioned line 57 leads into the bore 61 above the smaller diameter portion 64 of the piston 63; the common line 12c also leads from the bore 61 above the smaller diameter portion 64 of the piston 63. Therefore, the position of the piston 63 within its composite bore 61 and 62 is a function of the pressure within the bore 61 above the small diameter end of the piston 63 and in the bore 62 beneath the enlarged diameter portion 65 of the piston 63.

These relative pressures are determined by the position of the above referred to valve 51, which either allows well production fluid pressure to pass to the lower section of the force multiplier or not, as seen in FIGS. 2 and 3, and in addition, is under the control of the pilot valve means PV referred to above.

This pilot valve is effectively interposed in the line 12c between the upper section of the force multiplier means FM and the subsurface control valves described above, inasmuch as a line 12d leads from the line 12c to the pilot valve means PV, so as to be either closed or vented, depending upon the condition of the pilot valve means.

With reference to FIGS. 2 and 4 particularly, it will be noted that the pilot valve means, while being of any preferred fluid pressure responsive pilot valve type, is illustrated as comprising a spool 70 having end heads 71 and 72 reciprocable in a bore 73, into which fluid passing through line 12d finds access through ports 74. The position of the spool 70 in the bore 73 is a function of pressure applied to the lower piston 72 and supplied through line 41e leading from the flow lines 41 and 44 at the down-stream side of the chokes 41a and 44a respectively, such pressure being resisted by adjustable spring means 75 acting through a pin 76 on the upper piston end 71 of the spool 70. The spring 75 may be adjusted by an adjuster screw 77 so as to more or less resist upward movement of the valve spool 70 under the influence of production fluid pressure applied to the piston end 72 of the spool 70.

Upon downward movement of the spool 70 from the position shown in FIG. 4, fluid pressure in line 12d may be communicated through ports 78 to a vent line 79. Likewise should the valve spool 70 be moved downwardly by spring 75 overcoming the effect of well production pressure on the lower piston of the spool 70, the fluid from the line 12d may be vented through line 79. Under the control of valve 51, line 56 is exhausted to atmosphere, as shown in FIG. 2, when the well fluid pressure is supplied to the force multiplier through line 55, whereas line 55 is exhausted to atmosphere when well fluid pressure is supplied to the force multiplier via line 56.

Referring now to FIGS. 5 and 6, a preferred embodiment of the force multiplier FM is shown, wherein projecting upwardly from the upper end of the piston 63 is an actuator stem 51a for the control valve 51. This actuator stem passes through an opening 57b in the upper end of the cylinder body 60 and is connected to one end of a coiled tension spring 51c, the other end of which is connected to an operating lever 51d, the lever will be snap actuated by the spring 51c so that the rotor 53 will be in the position shown in FIG. 3.

Preferably, the valve 51 is supported at the upper end of cylinder 60 as by means of a bracket 80 bolted or otherwise secured as by fasteners 81 to the upper end of cylinder 60.

Except for the force multiplier as shown in FIG. 3, the components of the surface control means and each of the subsurface valves are illustrated in condition to enable the ultimate production of fluid from each of the subsurface well zones. However, should a condition occur to cause or enable operation of the pilot valve means PV so that fluid pressure in the force multiplier bore 61 above the small diameter section 64 will be exhausted to atmosphere through line 79, fluid pressure derived from well production fluid via tank section R2, line 50, valve 51 and line 55 will cause movement of the force multiplier piston 63 upwardly to the position shown in FIG. 3, but at the same time control lines 12 and 30 will be exhausted through the pilot valve means and vent line 79, thus relieving each of the subsurface valves AV and TV of the overbearing fluid pressure required to hold the same open, with the result that these subsurface valves will be closed, thus shutting in the two productive well zones.

It will be recognized from the foregoing that while in the illustrative embodiment a single pilot valve is shown as controlling both of the subsurface valves, a pilot valve may be provided in the system for each of the subsurface valves, and the subsurface valve may be individually controlled by parallel hydraulic circuitry.

Following correction of the condition which causes or enables operation of the pilot valve resulting in closure of the subsurface valves, the control valve 51 may be manually operated, that is moved from the position shown in FIG. 3 to that shown in FIG. 2, and fluid pressure initially supplied from a source at the surface as illustrated in FIG. 1 may be applied to the system to hydraulically open the subsurface valves. In this connection it will be understood that the valve lever 51d while being held in the position shown in FIG. 3 by spring 51c may nevertheless be manually moved to the position shown in FIG. 2. As a consequence of such manual movement the conduit 55 which, as shown in FIG. 3 was open to exhaust, will be placed in communication with the reservoir R2 so that fluid under pressure will be admitted to the force multiplier bore 62 beneath the large diameter end 65 of the piston 63 and fluid in the smaller diameter bore 61 will be pressurized to apply the force necessary to hold the subsurface valve open. Upon resumption of production through the respective valves so that the pressure of production fluid may be applied to the force multiplier through reservoir section R2, through line 50, valve 51 and line 55, fluid pressure at a value necessary to hold the subsurface valves open will continue to be applied to the latter through line 12c. It will be understood that the pressure applied to hold the subsurface valves open is a function of the pressure applied to the larger area of the force multiplier piston 64 and the resultant force applied to the fluid in the smaller bore 61 and through the control lines to the subsurface valves so that the force multiplier provides means for subjecting the subsurface valves to well pressure times a factor derived from the differential area of the force multiplier piston. Preferably, the differential piston 63 may be provided with a ratio of the order of between 1.25:1 to 1.50:1, so that for example, the existence of a production fluid pressure of 100 p.s.i. provides a fluid pressure acting to hold the valves open on the order of from 125 to 150 p.s.i.

In addition to the foregoing, it will be appreciated that the apparatus described will inherently compensate for leakage in the hydraulic system between the force multiplier and the subsurface valve actuator chambers. In this connection, any leakage in that closed system will permit the gradual raising of the differential force multiplier piston 63 towards the position at which the control valve 51 will be actuated from the position shown in FIG. 2 to the position shown in FIG. 3. Should such leakage occur as to enable actuation of the valve 51 as just referred to, communication will be established between the tank section R2 and the intermediate section of the force multiplier in counterbore 62 above the large diameter end 65 of the piston 63, such communication taking place through line 50, valve 51 and line 56. The control lines or tubings 12 and 30 will not be exhausted to atmosphere under these circumstances, since the position of the pilot valve means PV will not have been affected and since the check valve 12v (see FIG. 2) prevents back flow of pressure from lines 12b and 30b, no loss of pressure being supplied to the subsurface valves is allowed. The counterbore 62 beneath the differential piston end 65 will exhaust to atmosphere as shown in FIG. 3, and the piston 63 will be moved downwardly, bringing into the system additional fluid from tank reservoir section R1, through check valve 57c and line 57.

While the specific details of the illustrative embodiment of the invention have been herein shown and described, changes and alterations may be resorted to without departing from the spirit of the invention as defined in the appended claims.

I claim:

1. Flow control apparatus comprising: a fluid flow conduit shut-off valve means in said conduit through which said fluid flows including a member movable between a first position permitting said flow and a second position preventing such flow; hydraulic force multiplier means for holding said member in said first position including a cylinder having a differential piston therein, means for hydraulically connecting the smaller end of said piston to said member to hold the latter in said first position; means for conducting fluid pressure from said conduit downstream of said valve means to the larger end of said piston, and control valve means for venting said cylinder at said smaller end of said piston, said control valve means including pilot valve means responsive to the pressure of fluid flowing through said shut-off valve means.

2. Flow control apparatus comprising: a fluid flow conduit shut-off valve means in said conduit through which said fluid flows including a member movable between a first position permitting said flow and a second position preventing such flow; hydraulic force multiplier means for holding said member in said first position, including a cylinder having a differential piston therein, means for hydraulically connecting the smaller end of said piston to said member to hold the latter in said first position; means for conducting fluid pressure from said conduit downstream of said valve means to the larger end of said piston, and control valve means for venting said cylinder at said larger end of said piston, said control valve means including operating means responsive to movement of said piston in the direction of its smaller end.

3. Flow control apparatus comprising: a fluid flow conduit shut-off valve means in said conduit through which said fluid flows including a member movable between a first position permitting said flow and a second position preventing such flow; hydraulic force multiplier means for holding said member in said first position, including a cylinder having a differential piston therein, means for hydraulically connecting the smaller end of said piston to said member to hold the latter in said first position; means for conducting fluid pressure from said conduit downstream of said valve means to the larger end of said piston, control valve means for venting said cylinder at said larger end of said piston, said control valve means including operating means responsive to the position of said piston to vent the cylinder at the larger end of said piston; said cylinder and piston forming a chamber and said piston having a surface responsive to pressure in said chamber for moving said piston in the direction of its larger end when said cylinder is vented at said larger end of said piston; and means for venting said cylinder at the smaller end of said piston so that said piston will move in the direction of its smaller end to a position for operating said operating means.

4. Flow control apparatus comprising: a fluid flow conduit shut-off valve means in said conduit through which said fluid flows including a member movable between a first position permitting said flow and a second position preventing such flow; hydraulic force multiplier means for holding said member in said first position, including a cylinder having a differential piston therein, means for hydraulically connecting the smaller end of said piston to said member to hold the latter in said first position; means for conducting fluid pressure from said conduit downstream of said valve means to the larger end of said piston, and control valve means for venting said cylinder at said larger end of said piston, said control valve means including operating means responsive to the position of said piston to vent the cylinder at the larger end of said piston; said cylinder and piston forming a chamber and said piston having a surface responsive to pressure in said chamber for moving said piston in the direction of its larger end when said cylinder is vented at said larger end of said piston, means for conducting fluid flowing through said shut-off valve to said chamber; and means for venting said cylinder at the smaller end of said piston so that said piston will move in the direction of its smaller end to a position for operating said operating means.

5. Flow control apparatus comprising: a fluid flow conduit shut-off valve means in said conduit through which said fluid flows including a member movable between a first position permitting said flow and a second position preventing such flow; hydraulic force multiplier means for holding said member in said first position, including a cylinder having a differential piston therein, means for hydraulically connecting the smaller end of said piston to said member to hold the latter in said first position; means for conducting fluid pressure from said conduit downstream of said valve means to the larger end of said piston, and control valve means for venting said cylinder at said larger end of said piston, said control valve means including operating means responsive to the position of said piston to vent the cylinder at the larger end of said piston; said cylinder and piston forming a chamber and said piston having a surface responsive to pressure in said chamber for moving said piston in the direction of its larger end when said cylinder is vented at said larger end of said piston; reservoir means for supplying fluid to said cylinder at the smaller end of said piston; and means for venting said cylinder at the smaller end of said piston so that said piston will move in the direction of its smaller end to a position for operating said operating means.

6. Apparatus for controlling the operation of a fluid pressure controlled shut-off valve in a flow conduit comprising: a force multiplier including a cylinder and a differential piston in said cylinder, means for connecting said cylinder at the larger end of said cylinder with said conduit, means for connecting said cylinder at the smaller end of said cylinder with said valve, and valve means for venting said cylinder at said larger end of said cylinder, responsive to the position of said piston, and means including a source of fluid pressure connected to said cylinder at its smaller end for moving said piston from said position upon venting of said cylinder.

7. Apparatus as defined in claim 6, and including valve means for venting said cylinder at said smaller end of said cylinder, including fluid pressure responsive pilot valve means having means for connection to said flow conduit to conduct the fluid therein to said pilot valve means.

References Cited by the Examiner

UNITED STATES PATENTS

| | | | |
|---|---|---|---|
| 2,432,088 | 12/1947 | Caldwell | 251—57 X |
| 2,780,290 | 2/1957 | Natho | 251—57 X |
| 2,843,349 | 7/1958 | Meyer | 251—57 X |
| 3,007,492 | 11/1961 | Grimmer | 137—492 X |
| 3,149,538 | 9/1964 | Brollo | 91—345 X |

MARTIN P. SCHWADRON, *Acting Primary Examiner.*

M. CARY NELSON, *Examiner.*